United States Patent [19]
Kuderer

[11] Patent Number: 5,116,123
[45] Date of Patent: May 26, 1992

[54] METHOD FOR OPERATING A PHOTODIODE ARRAY SPECTROMETER AND PHOTODIODE ARRAY SPECTROMETER

[75] Inventor: Hubert Kuderer, Waldbronn, Fed. Rep. of Germany

[73] Assignee: Hewlett-Packard Company, Palo Alto, Calif.

[21] Appl. No.: 454,371

[22] Filed: Dec. 21, 1989

[30] Foreign Application Priority Data

May 20, 1989 [EP] European Pat. Off. ............ 89109138

[51] Int. Cl.$^5$ .......................... G01J 3/18; G01J 3/42
[52] U.S. Cl. ...................................... 356/326; 356/328
[58] Field of Search ....................... 356/308, 326, 328

[56] References Cited

U.S. PATENT DOCUMENTS 4,330,209 5/1982 Hashimoto et al. ................. 356/328
4,958,928 9/1990 Kuderer ............................. 356/328

FOREIGN PATENT DOCUMENTS 0192200 8/1986 European Pat. Off. .

OTHER PUBLICATIONS

Joachim Leyrer, Gunter E. Nill, Detlev Hadbawnik, Gunter Hoschele and Joachim Dieckmann, "A High-Speed Spectrophotometric LC Detector", Hewlett-Packard Journal, Apr. 1984, pp. 31–41.

Primary Examiner—F. L. Evans

[57] ABSTRACT

A photodiode array spectrometer for determining the spectral composition of a polychromatic beam of radiation comprises an array of photosensitive elements intercepting different wavelengths of the polychromatic beam of radiation. An output signal representative of the charge accumulated by a charge amplifier circuit is obtained each time a predetermined number greater than 1 of photosensitive elements is scanned such that the output signal is representative of the integral of a plurality of the amounts of radiation intercepted by a corresponding plurality of the photosensitive elements.

18 Claims, 4 Drawing Sheets

METHOD FOR OPERATING A PHOTODIODE ARRAY SPECTROMETER AND PHOTODIODE ARRAY SPECTROMETER

BACKGROUND OF THE INVENTION

The invention relates to a photodiode array spectrometer which can be used, for example, for measuring the absorption spectrum of a sample substance in order to derive information about the chemical composition of the sample and the quantities of the individual constituents in the sample.

A photodiode array spectrometer is disclosed in "A High-Speed Spectrophotometric LC Detector", Hewlett-Packard Journal, April 1984. This known spectrometer is used in a liquid chromatograph for analyzing the substances eluting from the chromatographic column. The known spectrometer comprises a light source emitting a broad spectrum of ultraviolet and visible radiation and an optical system for focusing the beam onto a sample cell through which the sample substances to be analyzed flow. Depending on the specific substances flowing through the cell, the sample absorbs certain characteristic spectral portions of the radiation entering the sample cell so that, the spectral composition of the radiation leaving the cell is indicative of the sample substances.

In the known spectrometer, the spectrum of the radiation leaving the sample cell is derived by means of a diffraction grating arranged in the optical path behind the cell. The diffraction grating directs light rays of different wavelengths into different directions. A linear array of photodiodes is arranged to receive the light diffracted by the grating. Each diode receives light corresponding to a different wavelength range. The electrical signals produced by the impinging light in each photodiode are read by a read-out circuit and converted to digital data values which are representative of the intensity of the light impinging on the specific diode. These data values are then displayed as a function of wavelength in any convenient form, for example on a CRT screen.

The photodiode array is built on semiconductor material and comprises a plurality of photosensitive elements which are connected via electronic switches to a common output line (video line) which in turn is connected to a so-called charge amplifier, more specifically a charge accumulator or a charge-voltage-converter. Each photosensitive element has an associated capacitor which represents the junction capacitance of the photodiode. The combination of photosensitive element and associated capacitor will subsequently also be referred to as "photocell". Light impinging on the photosensitive material generates charge carriers which discharge these capacitors. In operation, the capacitors of the photocells are initially charged to a fixed value, respectively, and then the whole array is scanned in predetermined intervals by sequentially closing the switches such that the photocells are recharged by the charge amplifier to their original charge level. The amount of charge transferred hereby causes a voltage change at the output of the charge amplifier which is proportional to the amount of light which has caused the discharge of the photocell.

Three important quantities for characterizing the performance of a spectrometer are spectral resolution, spectral range and sensitivity. Spectral resolution indicates how well radiation components with closely adjacent wavelengths are separated so that they can be identified as separate components. Spectral range indicates the interval of wavelengths which can be analyzed by the spectrometer. Sensitivity indicates how well weak signals can be distinguished from background noise and corresponds to the signal/noise ratio. In spectrometers using photodiode arrays as light detecting elements, the requirement of a wide spectral range at a given resolution leads to arrays with a large number of individual photodiodes, e.g., 1024 diodes. For each reading out of a photosensitive element during a scan, a new data value is obtained, which is further processed, e.g., by an A/D converter. The sensitivity of a spectrometer can generally be improved by increasing the power of the light source of the spectrometer. As a consequence thereof, the light power incident on the photodiodes also increases so that the capacitors associated with the photosensitive elements are discharged to a larger extent than in case of lower light power. Since the capacitors must not be completely discharged in order to avoid nonlinearities and since the size of the capacitors is limited by economic usage of the chip area of the photodiode array, the scan rate with which the capacitors are recharged has to be increased when the light power is increased. Consequently, the number of data values per time unit, i.e., the data rate, is increased unless the number of photocells is reduced which, however, would result in a smaller spectral range and/or resolution. According to the foregoing considerations, known photodiode array spectrometers are not satisfactory in all respects because they require a compromise between spectral resolution, spectral range, sensitivity and data rate so that not all of these parameters can be simultaneously selected to the desired value in a specific application. Known photodiode array spectrometers therefore require comparatively high circuit expense if high performance of the spectrometer is desired.

SUMMARY OF THE INVENTION

It is an Object of the invention to provide a photodiode array spectrometer and method of operation which permits an increase in sensitivity without substantially increasing the cost and complexity of the signal processing circuitry.

It is a more specific object of the invention to provide a read out from the photosensitive elements of the photodiode array at a higher frequency than the charge amplifier produces output signals. Therefore, less data is produced within a certain time interval than in prior art photodiode arrays of comparable performance wherein, during each scan, each reading out of a photodiode produces an output signal of the charge amplifier. Thus, the data rate of the spectrometer is kept small since the rate at which output signals of the charge amplifier circuit occur is smaller than the scanning rate of the photosensitive elements.

It is a further object of the invention to provide a greater light throughput of the spectrometer as compared with conventional spectrometers without increasing the data rate, i.e. the rate of the output signal which has to be further processed, for example, by means of an A/D converter.

It is a further object of the invention to achieve a greater scanning rate of the photosensitive elements than with conventional spectrometers without raising the data rate of the output-signal so as to avoid saturation effects and resulting non-linearities of the photosensitive elements.

It is another object of the invention to avoid the use of costly data processing and data storage circuits such as high speed A/D converters, microprocessors, and mass storage devices which would be otherwise necessary if a higher data rate had to be used.

In accordance with these and other objects of the invention, a method and apparatus are provided wherein a photodiode array spectrometer is used to determine the spectral composition of a polychromatic beam of radiation and the spectrometer comprises an array of photosensitive elements intercepting different wavelengths of the polychromatic beam of radiation.

In accordance with this invention, the signals are generated representing a radiation intercepted by each of the photosensitive elements and various combinations of the signals are integrated so as to generate an output signal representing a radiation intercepted by various combinations of the plurality of the photosensitive elements.

In a preferred embodiment of the invention, a plurality of transfer switching elements are respectively connected to the photosensitive elements and are closed in various combinations for generating the signals representing the radiation intercepted by the various combinations of the plurality of photosensitive elements.

In the preferred embodiment of the invention, a charge amplifier circuit is connected to the photosensitive elements through the plurality of transfer switching elements for performing in the integration. The charge is transferred from the charge amplifier circuit while integrating the various combinations of the signals.

In accordance with one aspect of the invention, the charge amplifier circuit may comprise a variable integrating capacitance which is varied. In a preferred embodiment of the invention, the variable integrating capacitance may be varied in binary weighted steps.

DETAILED DESCRIPTION OF A PREFERRED EMBODIMENT

Figure 1:
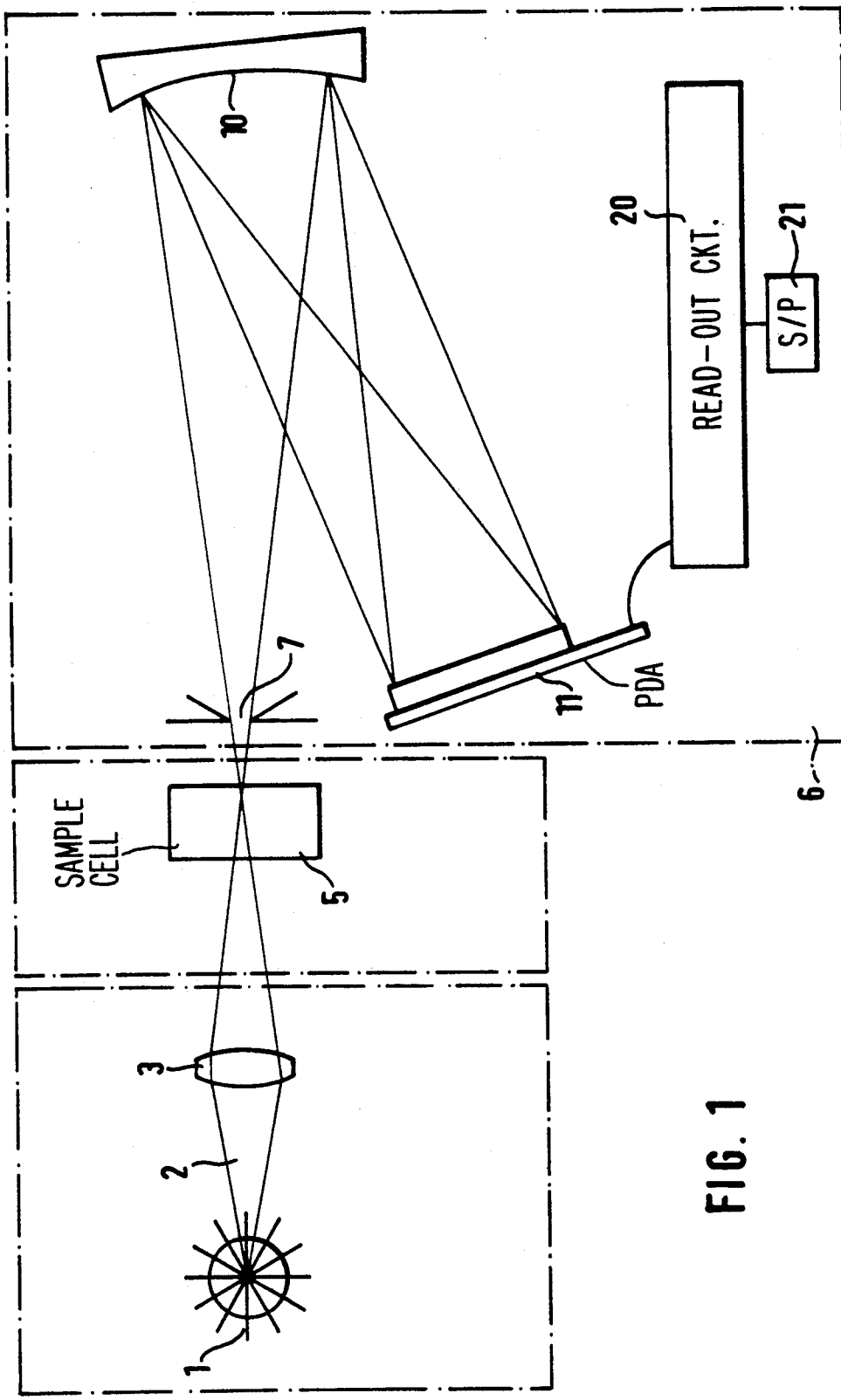
FIG. 1 is a schematic diagram of a photodiode array spectrometer comprising a photodiode array according to the invention.

FIG. 1 schematically shows a photodiode array spectrometer for measuring the absorption of a polychromatic beam of ultraviolet and/or visible radiation by a sample to be analyzed. The spectrometer comprises a light source 1, e.g. a deuterium lamp, which emits a beam 2 of polychromatic radiation. The beam 2 is focused by a lens system 3 into a sample cell 5. The lens system 3 preferably is an achromatic system which ensures that rays of different wavelengths substantially have the same focal point. A shutter is provided to interrupt the light beam 2 in order to measure the dark signal at the photodiodes of the photodiode array 11. In the actual measuring process and apparatus wherein the beam 2 passes through the sample cell 5, the dark signal and other electronic offset signals are subtracted from the measuring values to compensate for any measuring errors.

The sample cell 5 may comprise an inlet and an outlet through which a sample liquid to be analyzed flows continuously. Such a spectrometer can be used, for example, in a liquid chromatograph wherein the inlet is connected to the chromatographic separation column from which sample substances are continuously eluting.

The polychromatic radiation entering the sample cell 5 is partially absorbed by the substances in the cell, whereby, depending on the sample substances, rays of certain wavelengths are absorbed more strongly than rays of other wavelengths. As a result, the beam leaving the cell and entering the spectrograph 6 through an entrance slit 7 of variable width has a different spectral composition than the beam entering the cell and the resulting spectrum thus contains information about the kind of substances in the cell and about their quantities.

The beam passing the entrance slit 7 impinges on a holographic diffraction grating 10, which disperses the light according to the different wavelengths in the beam impinging on it. The spatially separated light rays from the grating 10 impinge on the photodiode array which consists of a plurality of individual light-sensitive diodes, which are separated by light-insensitive gaps.

The photodiode array 11 is connected to a read-out circuit 20 for periodically reading out electrical signals from the photodiodes, whereby these signals are indicative of the intensity of the light rays impinging on the photodiodes, respectively. Details of the read-out circuit 20 are explained below with reference to FIGS. 2 and 3. The electrical signals read out from the photodiode array 11 are then further processed in a signal processing circuit 21 which typically comprises an analog-to-digital converter 22 and circuitry for storing and further processing these digital values. The operation of the read-out circuit 20 and the signal processing circuit 21 is controlled by a controller 23 (FIG. 3), typically comprising a microprocessor, which also controls the operation of a display means for displaying the final spectrum of the analyzed sample. The signal processing circuit 21 may also comprise circuitry for correcting the electrical signals from the individual photodiodes regarding the above-mentioned dark currents of the photodiodes and for other effects.

Figure 2:
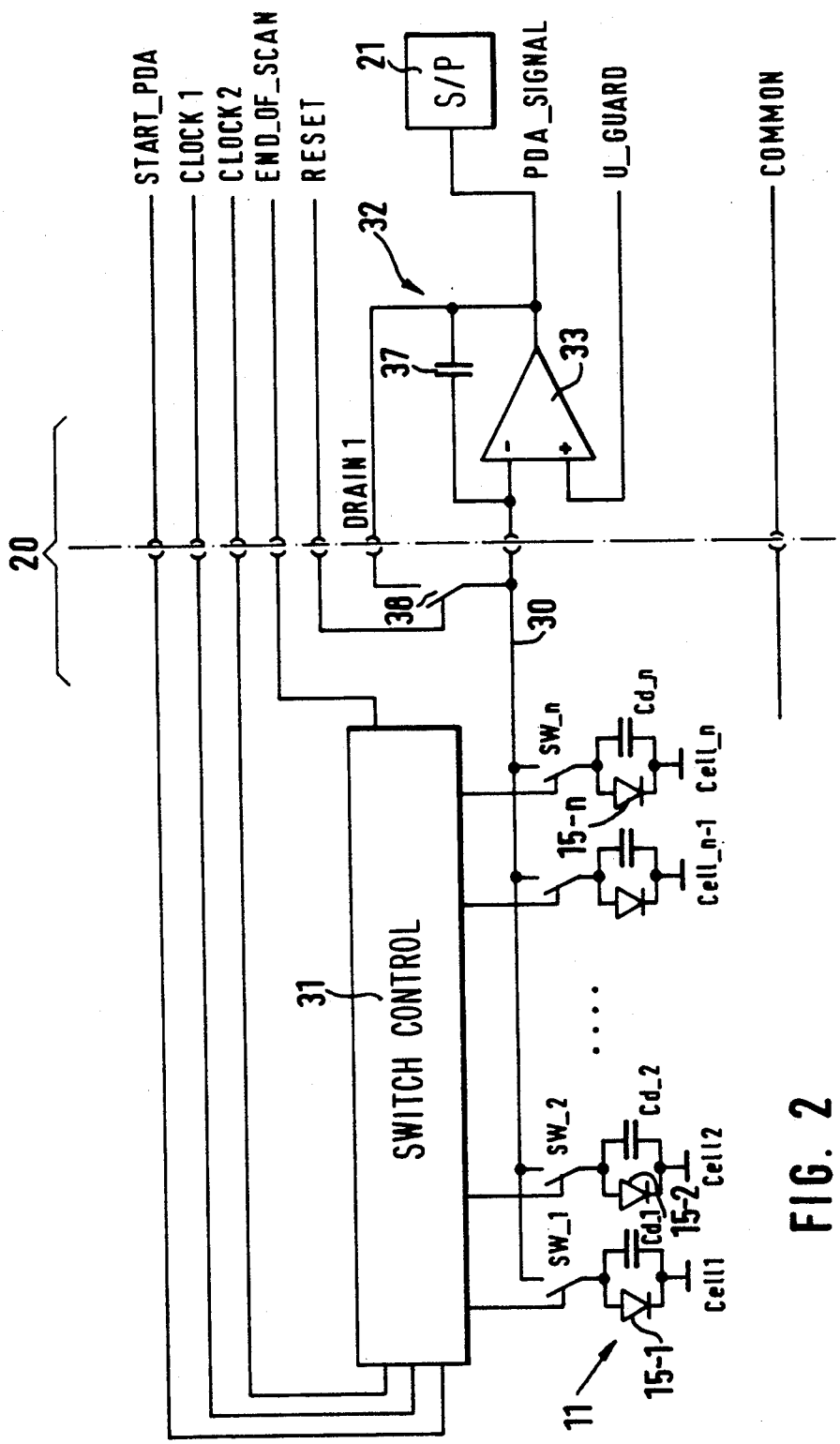
FIG. 2 schematically shows the photodiode array of the invention with a charge amplifier circuit for reading out the array.

FIG. 2 schematically shows the photodiode array 11 comprising a plurality of n individual photodiodes 15-1, ..., 15-n forming part of a semiconductor chip. Each of the photodiodes intercepts a specific spectral portion of the diffracted radiation (if the entrance slit 7 has a small width corresponding to the highest resolution of the spectrometer). Each photodiode has an associated capacitor $Cd1, ..., Cdn$ which represents the junction capacitance of the photodiodes, or, in applications where a separate capacitor is switched in parallel to the photodiodes, the sum of this capacitor and the junction capacitance. The photodiodes and the associated capacitor will also be referred to as photocells Cell 1, Cell 2, ..., Cell n. The cells 1 ... n are connected to a common video line 30. The electrical connections between the individual cells and the video line 30 can be interrupted by means of electronic switches SW1 ... SWn, respectively. The switches are controlled by a switch control circuit 31. The switch control circuit is explained in more detail below with reference to FIG. 3.

The video line 30 is connected to a charge amplifier 32 which is designed as an integrator comprising an operational amplifier 33 with a capacitor means 37 in the feedback loop. The non-inverting input of the operational amplifier 33 is connected to the signal U guard which has a fixed potential of, for example, −5 V. Thus, the inverting input (video line 30) virtually has the same potential. A controllable reset switch 38 across the capacitor means is closed before each charge transfer to reset the integrator.

In operation, the capacitors of selected photocells are initially charged to a fixed value. When photons are penetrating the photosensitive material, charge carriers are generated which discharge the capacitors corresponding to the amount of photons received within a given integration period. The discharge level of each individual capacitor is proportional to the incident light intensity during the integration period.

These capacitors are periodically recharged in further scan sequences. The amount of charge transferred hereby causes a voltage change at the output of the charge amplifier 32 which is proportional to the integral of the incident light level during the integration period. The output signal of the charge amplifier 32, the "PDA signal", is now further processed by additional circuits, including a sample and hold circuit 35 and an A/D converter. Before each charge transfer from the charge amplifier to a cell, the reset switch 38 is closed to reset the charge amplifier 32 in preparation for the next charge transfer.

Figure 3:
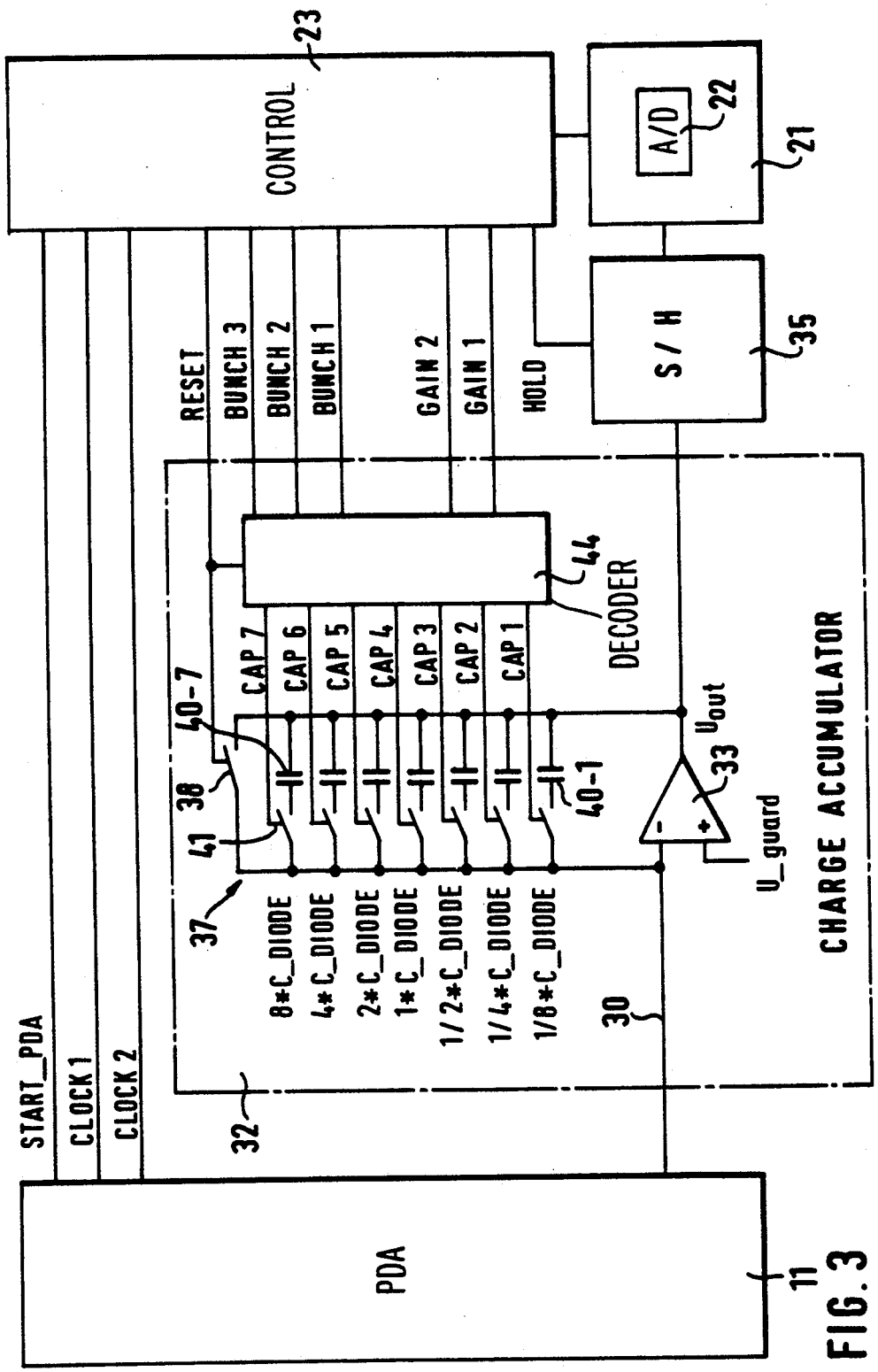
FIG. 3 shows in more detail an embodiment of the switch control circuit of a photodiode array according to the invention.

The capacitor means 37 is shown more exactly in FIG. 3 and comprises a plurality of (in the example) seven capacitors 40-1 ... 40-7 having capacitances of $\frac{1}{8}$, $\frac{1}{4}$, $\frac{1}{2}$, 1, 2, 4 and 8 times, respectively, the capacitance of the diode which forms the photosensitive element. The capacitors 40 are each connected in series with a corresponding controllable switch 41 which is formed by an FET, the control electrode of which is connected to a respective output of the decoder 44. The purpose of having a variety of selectable capacitors is firstly providing the proper amount of full scale capacitance according to the number of photo cells accumulated, secondly providing the capability of proper gain setting for each individual bunch of photo cells.

The outputs of the decoder are controlling the FET's to switch the desired capacitors into the feed back loop of the integrator. Which combination of capacitors is switched on depends on the pattern on the signal lines Bunch 1 ... Bunch 3 and the pattern on the signal lines Gain 1 and Gain 2. The pattern on the lines Gain 1 and Gain 2 represents the actual gain factor (1, 2, 4 or 8) for an individual bunch of photo cells. The pattern on lines Bunch 1 ... Bunch 3 represents the binary coded number of photo cells to be accumulated. Any number in a range from 1 to 8 is possible in the example but less than all photocells in the spectrometer. A bunch consists of consecutive photo cells of the photodiode array.

The truth table for the decoder is shown in table 1. While the pattern of the signal lines Bunch 1 ... Bunch 3 is kept constant (corresponding to the width of the entrance slit) during a complete analysis, the patterns on the signal lines Gain 1, Gain 2 are controlled for each individual bunch of photo cells. The gain patterns for all individual bunches of photo cells are stored in a memory of the controller at the beginning of an analysis by taking a blank scan with a fixed gain factor and assigning the gain pattern according to the photon density for the individual wavelength increments. During an analysis, before each read-out of a bunch of photo cells, the controller sets the actual gain pattern to signal line Gain 1 and Gain 2 and resets the charge accumulator by activating the reset switch through the reset line. During the "reset"-pulse, all capacitors are switched into the feed back loop. This causes the capacitors to be nulled during the reset operation of the charge accumulator.

With an amplification of 1, the total capacitance of the capacitor means 37 is the capacitance of Cd multiplied by the number of the photodiodes in a bunch. With amplifications greater than 1, the total capacitance is smaller.

Figure 4:
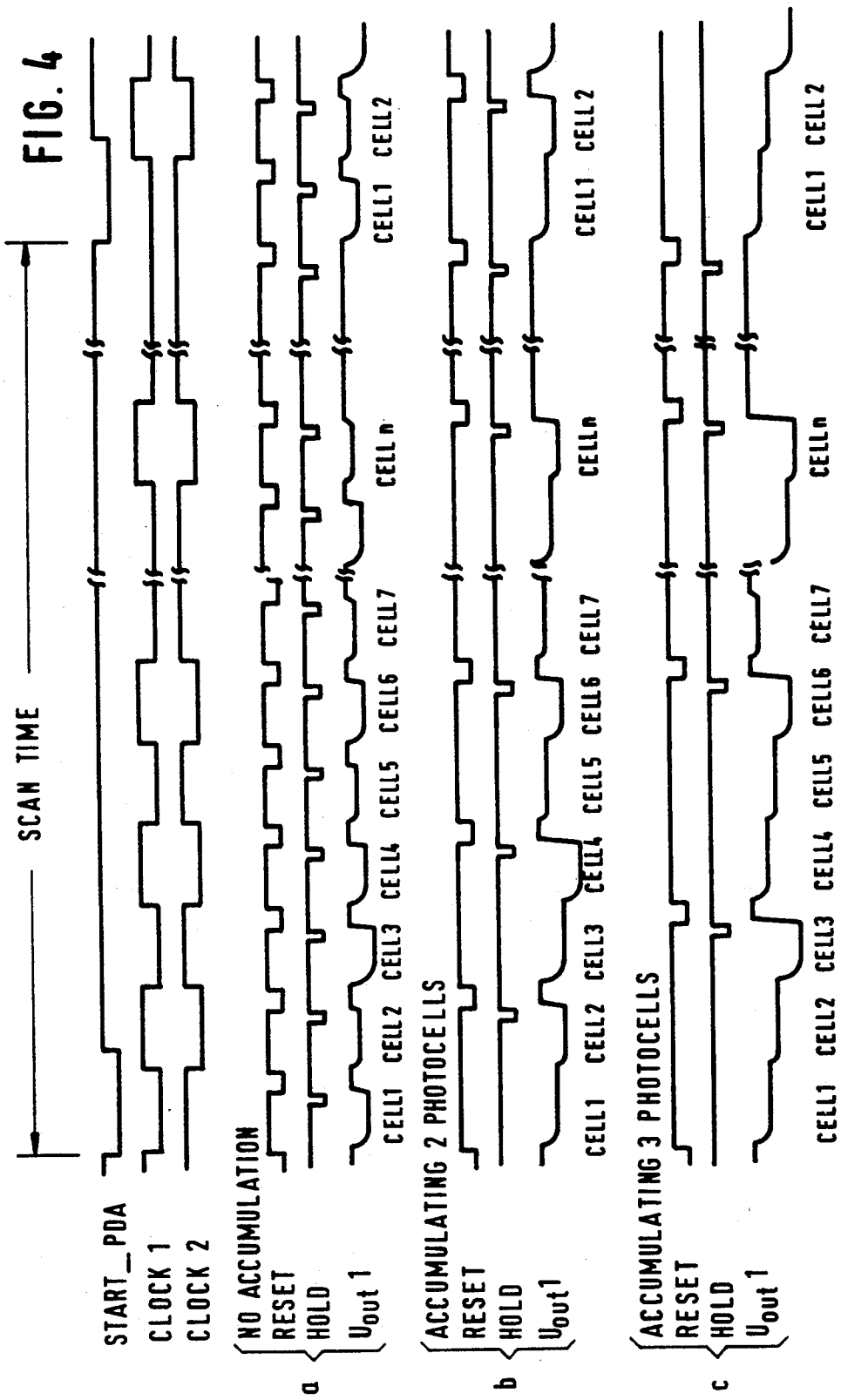
FIG. 4 shows timing diagrams.

The timing diagram of FIG. 4 shows the clock signals sent to the photo diode array and the associated reset and output signal (V-out) for different numbers of photocells accumulated. Note, that this timing diagram is not to scale. The clock frequency for the clocks (START-PDA, CLOCK 1, CLOCK 2) is variable and has to be adapted to the photodensity depending on the width of the entrance slit. If the slit width is increased, the spectral resolution is dominated by the entrance slit and bunching of photo cells is possible without significantly affecting the total spectral resolution of the spectrograph. Bunching of photo cells compensates for higher scan rates and the conversion rate of the A/D converter can be kept constant. FIG. 4 shows signals for "no accumulation" (a), that is the known kind of operation of the spectrometer, and for an accumulation of two (b) and three (c) photocells.

Though the switch means ($SW_{13}1$ to $SW_{13}n$, 38, 41) are all electronic switching elements, they are shown as simple switches in order to simplify the drawings.

TABLE 1

Truth table for decoder of charge accumulator

| Bunch 321 | #diodes | Gain 21 | Amplification | Cap 7654321 | Total Capacitance |
|---|---|---|---|---|---|
| 000 | 1 | 00 | 1 | 0001000 | 1 × Cd |
| 001 | 2 | 00 | 1 | 0010000 | 2 × Cd |
| 010 | 3 | 00 | 1 | 0011000 | 3 × Cd |
| 011 | 4 | 00 | 1 | 0100000 | 4 × Cd |
| 100 | 5 | 00 | 1 | 0101000 | 5 × Cd |
| 101 | 6 | 00 | 1 | 0110000 | 6 × Cd |
| 110 | 7 | 00 | 1 | 0111000 | 7 × Cd |
| 111 | 8 | 00 | 1 | 1000000 | 8 × Cd |
| 000 | 1 | 01 | 2 | 0000100 | 0.5 × Cd |
| 001 | 2 | 01 | 2 | 0001000 | 1.0 × Cd |
| 010 | 3 | 01 | 2 | 0001100 | 1.5 × Cd |
| 011 | 4 | 01 | 2 | 0010000 | 2.0 × Cd |
| 100 | 5 | 01 | 2 | 0010100 | 2.5 × Cd |
| 101 | 6 | 01 | 2 | 0011000 | 3.0 × Cd |
| 110 | 7 | 01 | 2 | 0011100 | 3.5 × Cd |
| 111 | 8 | 01 | 2 | 0100000 | 4.0 × Cd |
| 000 | 1 | 10 | 4 | 0000010 | 0.25 × Cd |
| 001 | 2 | 10 | 4 | 0000100 | 0.50 × Cd |
| 010 | 3 | 10 | 4 | 0000110 | 0.75 × Cd |
| 011 | 4 | 10 | 4 | 0001000 | 1.00 × Cd |
| 100 | 5 | 10 | 4 | 0001010 | 1.25 × Cd |
| 101 | 6 | 10 | 4 | 0001100 | 1.50 × Cd |
| 110 | 7 | 10 | 4 | 0001110 | 1.75 × Cd |
| 111 | 8 | 10 | 4 | 0010000 | 2.00 × Cd |
| 000 | 1 | 11 | 8 | 0000001 | 0.125 × Cd |
| 001 | 2 | 11 | 8 | 0000010 | 0.250 × Cd |
| 010 | 3 | 11 | 8 | 0000011 | 0.375 × Cd |
| 011 | 4 | 11 | 8 | 0000100 | 0.500 × Cd |
| 100 | 5 | 11 | 8 | 0000101 | 0.625 × Cd |
| 101 | 6 | 11 | 8 | 0000110 | 0.750 × Cd |
| 110 | 7 | 11 | 8 | 0000111 | 0.875 × Cd |
| 111 | 8 | 11 | 8 | 0001000 | 1.000 × Cd |

Where Cap 1 to 7 represent the capacitors 40-1 to 40-7.

In accordance with one important aspect of the invention, the light throughput can be made greater compared with conventional spectrometers by using a light source of higher intensity. In most cases, however, since the light spot is circular, in order to increase the light throughput, it is possible to simply enlarge the slit width of the spectrometer with the consequence that the radiation of a specific wavelength covers a plurality of photosensitive elements. Broadening of the rays impinging onto the photosensitive elements simultaneously results in a light-integrating effect. Such broadening may be achieved by other means, e.g. optical means, e.g. a lens. The spectrometer may have a variable width of the entrance slit. Then, if the intensity of radiation impinging onto the photosensitive elements is relatively high, a small slit can be used in order to get a high resolution. When the intensity of the radiation is relatively low, a broader slit may be used in order to increase the light throughput and to reduce the effect of noise. If the intensity of radiation is high, it may be necessary to reduce the intensity e.g. by using a small slit width in order to take into account the sensitivity of the photosensitive elements. By increasing the light throughput by a factor n and accumulating the signals from n photocells, the improvement in signal to noise ratio is approximately a factor of n compared with a conventional spectrometer. Without increasing the light throughput the factor would be SQR (n), SQR being the abbreviation for square root.

Although a particular embodiment of the invention has been shown and described, other embodiments and modifications will occur to those of ordinary skill in the art as will fall within the true spirit and scope of the appended claims.

I claim:

1. A method of operating a photodiode array spectrometer for determining the spectral composition of a polychromatic beam of radiation, said spectrometer comprising a charge amplifier, comprising a variable integrating capacitance, connected to an array of photosensitive elements through a plurality of transfer switching elements, said array of photosensitive elements intercepting different wavelengths of the polychromatic beam of radiation, said method comprising the following steps:
   generating signals representing the radiation intercepted by each of said photosensitive elements; and
   integrating various combinations of said signals to generate an output signal representing the radiation intercepted by various combinations of said photosensitive elements.

2. The method of claim 1, further comprising the step of closing various combinations of said switching elements for generating signals representing the radiation intercepted by said various combinations of said plurality of photosensitive elements.

3. The method of claim 2, further comprising the step of transferring charge from said charge amplifier circuit while integrating various combinations of said signals.

4. The method of claim 3, further comprising the step of varying said integrating capacitance.

5. The method of claim 4, wherein said step of varying said integrating capacitance comprises varying in binary weighted steps.

6. A photodiode array spectrometer for determining the spectral composition of a polychromatic beam of radiation, comprising:
   an array of photosensitive elements intercepting different wavelengths of the polychromatic beam of radiation; and
   means for integrating signals generated by said photosensitive elements and representing the radiation intercepted by various combinations of said plurality of said photosensitive elements, said means including a controllable variable capacitor.

7. The photodiode array spectrometer of claim 6 further comprising transfer switching elements respectively connected to said photosensitive elements actuated in various combinations corresponding to said combinations of said plurality of photosensitive elements so as to generate signals representing a radiation intercepted by said various combinations of said plurality of said photosensitive elements.

8. A photodiode array spectrometer for determining the spectral composition of a polychromatic beam of radiation, comprising a charge amplifier, an array of photosensitive elements and a plurality of transfer switching elements, said charge amplifier connected to said photosensitive elements through said plurality of transfer switching elements, said charge amplifier integrating various combinations of signals from said photosensitive elements.

9. The photodiode array spectrometer of claim 8, wherein said charge amplifier comprises a variable integrating capacitance.

10. The photodiode array spectrometer of claim 9, further comprising means for varying said integrating capacitance in binary weighted steps.

11. Photodiode array spectrometer for determining the spectral composition of a polychromatic beam of radiation, comprising:
   an array of photosensitive elements intercepting different wavelengths of the polychromatic beam of radiation;
   a plurality of transfer switching elements, one switching element being connected to a photosensitive element, respectively;
   a read-out circuit connected to the transfer switching elements for opening and closing same and for generating during a read-out cycle signals indicative of the amount of radiation intercepted by the photosensitive elements;
   a charge amplifier circuit; and
   a common video line connecting the transfer switching elements to the charge amplifier circuit for transferring electric charges to a photosensitive element when the associated transfer switching element is closed, thus causing a voltage change at the output of the charge amplifier circuit, the voltage change being proportional to the amount of light which has impinged on the photosensitive element since the previous opening of the associated transfer switching element;
   the charge amplifier circuit comprising an integrator having controllable capacitor means in a feed-back loop, the capacitance of the capacitor means being sufficient to integrate the signals of a plurality of the photosensitive elements.

12. The spectrometer according to claim 11, wherein the capacitance of the capacitor means is controllable in binary weighted steps.

13. The spectrometer according to claim 11 or 12, wherein the capacitor means comprises a plurality of capacitors which can be switched in parallel by means of controllable switching elements such that a plurality of different capacitances can be formed.

14. The spectrometer according to claim 11, further comprising means for broadening the beam of radiation such that a specific wavelength of the beam impinges on a plurality of adjacent ones of the photosensitive elements.

15. The spectrometer according to claim 14 further comprising an entrance slit and broadening means for setting an appropriate width of the entrance slit.

16. The spectrometer according to claim 11, further comprising an entrance slit and means for varying the width of the entrance slit.

17. The spectrometer according to claim 11, wherein the capacitance of the capacitor means is controllable in binary weighted steps, wherein the capacitor means comprises a plurality of capacitors which can be switched in parallel by means of controllable switching elements such that a plurality of different capacitances can be formed, further comprising means for broadening the beam of radiation such that a specific wavelength of the beam impinges on a plurality of adjacent ones of the photosensitive elements.

18. The spectrometer according to claim 17, further comprising an entrance slit and means for varying the width of the entrance slit.

* * * * *

UNITED STATES PATENT AND TRADEMARK OFFICE
CERTIFICATE OF CORRECTION

PATENT NO. : 5,116,123
DATED : May 26, 1992
INVENTOR(S) : Hubert Kuderer It is certified that error appears in the above-identified patent and that said Letters Patent is hereby corrected as shown below:

Column 6, line 28, change "($SW_{13}1$ to $SW_{13n}$, 38, 41)" to --(SW_1 to SW_n, 38, 41)--.

Signed and Sealed this

Fourteenth Day of September, 1993

*Attest:*

BRUCE LEHMAN

*Attesting Officer*    *Commissioner of Patents and Trademarks*